United States Patent
Zhu et al.

(10) Patent No.: US 9,633,675 B2
(45) Date of Patent: Apr. 25, 2017

(54) INTERLACED MAGNETIC RECORDING SUPER PARITY

(71) Applicant: Seagate Technology LLC, Cupertino, CA (US)

(72) Inventors: Wenzhong Zhu, Apple Valley, MN (US); Kaizhong Gao, North Oaks, MN (US); Tim Rausch, Farmington, MN (US); Edward Charles Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/879,869

(22) Filed: Oct. 9, 2015

(65) Prior Publication Data

US 2016/0148625 A1 May 26, 2016

Related U.S. Application Data

(60) Provisional application No. 62/083,696, filed on Nov. 24, 2014, provisional application No. 62/083,732, filed on Nov. 24, 2014.

(51) Int. Cl.
| | | |
|---|---|---|
| *G11B 5/09* | (2006.01) | |
| *G11B 5/012* | (2006.01) | |
| *G11B 20/18* | (2006.01) | |
| *G11B 11/105* | (2006.01) | |
| *G11B 5/00* | (2006.01) | |
| *G11B 20/12* | (2006.01) | |
| *G11B 5/596* | (2006.01) | |

(52) U.S. Cl.
CPC .............. *G11B 5/09* (2013.01); *G11B 5/012* (2013.01); *G11B 20/1217* (2013.01); *G11B 20/1833* (2013.01); *G11B 5/59633* (2013.01); *G11B 5/59638* (2013.01); *G11B 11/10506* (2013.01); *G11B 11/10515* (2013.01); *G11B 11/10521* (2013.01); *G11B 11/10595* (2013.01); *G11B 20/12* (2013.01); *G11B 2005/0021* (2013.01); *G11B 2020/1222* (2013.01); *G11B 2020/1238* (2013.01)

(58) Field of Classification Search
None
See application file for complete search history.

(56) References Cited

U.S. PATENT DOCUMENTS

| | | |
|---|---|---|
| 4,030,130 A | 6/1977 | Smith |
| 4,298,897 A | 11/1981 | Arter et al. |
| 4,535,372 A | 8/1985 | Yeakley |

(Continued)

FOREIGN PATENT DOCUMENTS

| | | |
|---|---|---|
| EP | 0484774 A2 | 5/1992 |
| EP | 1564736 | 8/2005 |

(Continued)

*Primary Examiner* — Tan X Dinh
(74) *Attorney, Agent, or Firm* — Holzer Patel Drennan

(57) ABSTRACT

A storage device includes a storage medium having a first set of non-adjacent data tracks having a number of super parity sectors and a second set of non-adjacent data tracks interlaced with the first set of non-adjacent data tracks. The number of super parity sectors on a data track of the first set of non-adjacent data tracks is selected based on a distance between the data track and an inner diameter of the storage medium.

20 Claims, 7 Drawing Sheets

(56) References Cited

U.S. PATENT DOCUMENTS

| | | |
|---|---|---|
| 4,622,601 A | 11/1986 | Isozaki et al. |
| 4,646,168 A | 2/1987 | Sonobe et al. |
| 4,771,346 A | 9/1988 | Shoji et al. |
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,710,960 B1 | 3/2004 | Yorimitsu |
| 6,747,827 B1 | 6/2004 | Bassett et al. |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 * | 4/2014 | Grobis ............... G11B 5/09 360/45 |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,246 B1 | 9/2015 | Trantham et al. |
| 9,153,287 B1 * | 10/2015 | Hamilton ........... G11B 27/3027 |
| 9,324,362 B1 | 4/2016 | Gao |
| 9,396,062 B1 * | 7/2016 | Sridhara ............... G06F 11/10 |
| 9,418,688 B1 | 8/2016 | Rausch et al. |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 * | 6/2013 | Coker ................. G11B 19/045 360/31 |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 * | 2/2014 | Zaharris ............... G11B 5/012 360/55 |
| 2014/0153134 A1 | 6/2014 | Han et al. |
| 2014/0160589 A1 | 6/2014 | Deki et al. |
| 2014/0285923 A1 | 9/2014 | Aoki et al. |
| 2015/0178161 A1 * | 6/2015 | Burd .................. G11B 20/1833 714/764 |
| 2016/0148630 A1 * | 5/2016 | Rausch ................. G11B 5/09 360/77.02 |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | 02240862 A | 9/1990 |
| WO | 2005-030869 A1 | 4/2005 |

* cited by examiner

INTERLACED MAGNETIC RECORDING SUPER PARITY

CROSS-REFERENCE TO RELATED APPLICATIONS

The present application claims benefit of priority to U.S. Provisional Application No. 62/083,696, entitled "Interlaced Magnetic Recording in HAMR Devices" and filed on Nov. 24, 2014, and also to U.S. Provisional Patent Application No. 62/083,732, entitled "Interlaced Magnetic Recording" and filed on Nov. 24, 2014. All of these applications are specifically incorporated by reference for all that they disclose or teach.

BACKGROUND

Interlaced magnetic recording (IMR) generally refers to the concept of utilizing two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

SUMMARY

In IMR and similar systems, super parity sectors may be written on data tracks. These super parity sectors hold coding redundancies that enable error correction when reading from the data track. In IMR systems, a first set of data tracks may be written before a second set of interlaced data tracks are written. A data track of the first set of data tracks is referred to as a "bottom track," and a data track of the second set of the data tracks is referred to as a "top track." To re-write a bottom track, two adjacent top tracks may have to be read into memory before the bottom track is re-written. After the bottom track is re-written, the two adjacent top tracks are written again. A write of a top track can sometimes degrade the data on an adjacent bottom track (referred to as a servo write off track), but the servo write off track may not affect the data of an adjacent top track. Because two adjacent top tracks may have to be read into memory before a re-write of a bottom track and adjacent top tracks are not affected by a servo write off track, the top tracks need not include super parity sectors for error correction.

According to one implementation, a storage device includes storage media including a plurality of data tracks. The plurality of data tracks includes one subset of bottom tracks that include one or more super parity sectors. The plurality of data tracks includes a subset of top tracks interlaced with the subset of bottom tracks, and the top tracks need not include super parity sectors, freeing up available space for additional data sectors, which store user data.

According to another implementation, the disclosed technology provides for a method for writing a subset of bottom tracks including super parity sectors and subset of top tracks interlaced with the subset of bottom tracks, wherein the subset of top tracks need not include super parity sectors, freeing up available space for additional data sectors.

According to yet another implementation, a storage device includes storage media including a plurality of data tracks. The plurality of data tracks includes one subset of bottom tracks having one or more super parity sectors. The number one or more super parity sectors is selecting according to a distance of the plurality of data tracks from an inner diameter of the storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

As requirements for area storage density increase for magnetic media, cell size decreases. A commensurate decrease in the size of a write element is difficult because in many systems, a strong write field is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is interlaced magnetic recording (IMR).

As explained in further detail with reference to the various figures below, IMR systems may utilize two or more selected written track widths and two or more different linear densities for data writes to alternating data tracks on a storage medium. In these systems, data tracks may be read from or written to the data tracks in a non-consecutive order. For example, data may be written exclusively to a first track series including every other data track in a region of a storage medium before data is written to any data tracks interlaced between the tracks of the first series.

In IMR systems, a data track of wide written track width is written prior to directly adjacent data tracks of narrower written track width. The data tracks of the wider written track width are also referred to herein as "bottom tracks," while the alternating data tracks of narrower written width are referred to herein as "top tracks."

In some implementations, the bottom tracks of wider written track width include data stored at a different linear density than one or more top tracks of narrow written track width. In still other implementations (e.g., on a bit-patterned media), the bottom and top data tracks are of equal written track width.

IMR can allow for significantly higher areal recording densities than many existing data management systems.

However, effective IMR systems are designed to implement prioritized write access rules that can, in some implementations, entail significant read/write overhead. For instance, modifying a target data track in an IMR system may entail reading two or more adjacent top tracks into memory, modifying the target bottom track, and re-writing the two or more adjacent top tracks. The herein-disclosed technology explores the convergence of IMR with super parity sectors to increase user data area in IMR systems. Super parity sectors are included in a data track and are encoded with coding redundancies through error correction code (ECC) to enable error correction for the data track. Because of the prioritized access rules employed by IMR, top tracks may not need super parity sectors to correct errors.

Figure 1:
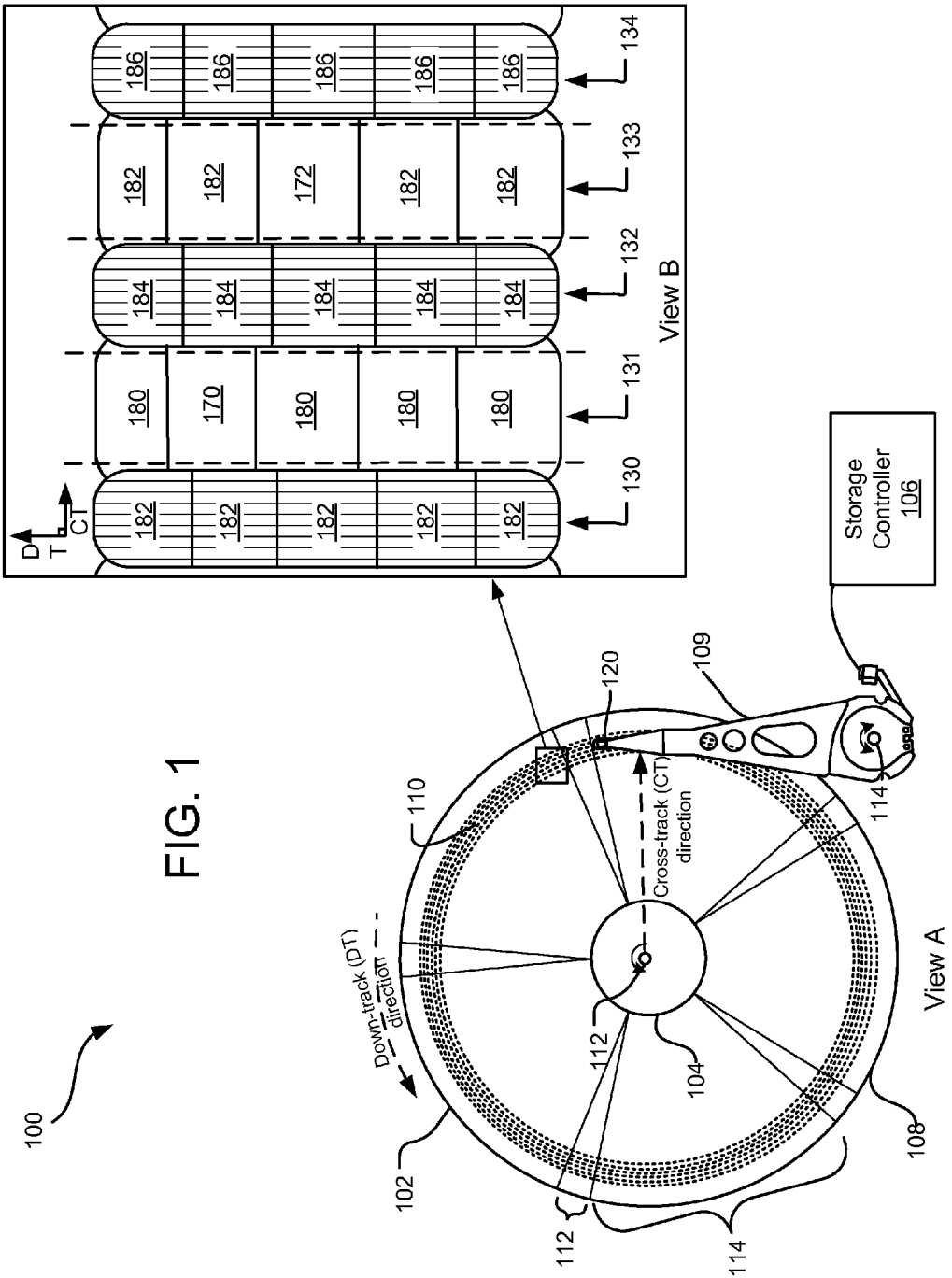
FIG. 1 illustrates a plan view of an example disc drive assembly.

FIG. 1 illustrates a plan view of an example disc drive assembly 100. Disc drive assembly includes a transducer head assembly 120 with a writer and reader (not shown) for writing and reading data to and from a magnetic storage medium 108. Transducer head assembly may include a number of reader and writer configurations such as HAMR, multiple read and/or write heads, etc. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The magnetic storage medium 108 is includes a number of servo sectors (e.g., a servo sector 112) extending radially between the inter diameter 104 and the outer diameter 102. In one implementation, each of the servo sectors (e.g., servo sector 112) includes embedded information used for track seeking and track following. In particular, the information includes fine head position information used for centerline tracking Between every two consecutive servo sectors (e.g., servo sector 112) is a wedge (e.g., a wedge 114) that includes multiple sectors (e.g., data sectors and super parity sectors, not shown) of concentric data tracks 110.

The transducer head assembly 120 is mounted on an actuator assembly 109 at an end distal to an actuator axis of rotation 114. The transducer head assembly 120 flies in close proximity above the surface of the magnetic storage medium 108 during disc rotation. The actuator assembly 109 rotates during a seek operation about the actuator axis of rotation 112. The seek operation positions the transducer head assembly 120 over a target data track for read and write operations.

The storage device 100 further includes a storage controller 106. The storage controller 106 includes software and/or hardware, and may be implemented in any tangible processor-readable storage media within or communicatively coupled to the storage device 100. The term "tangible processor-readable storage media" includes, but is not limited to, RAM, ROM EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor readable communication signals may embody processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

View B illustrates a magnified view of a section of the magnetic storage medium 108 including data tracks (e.g., data tracks 130, 131, and 132) storing data according to an interlaced magnetic recording (IMR) technique. The data tracks (e.g., data tracks 130, 131, and 132) are divided in to data sectors (e.g., data sectors 182, 180, and 184) which include a plurality of polarized regions (not shown), also referred to as "data bits," each representing one or more individual data bits of the same state (e.g., 1s or 0s). One or more of the data sectors of each data track may be reserved as a super parity sector for that data track (e.g., a super parity sector 170 for the data track 131 and a super parity sector 172 for the data track 133). The super parity sectors are encoded with coding redundancies through error correction code (ECC) to enable error correction for the data track.

The illustrated IMR technique utilizes alternating data tracks of different written track widths arranged with slightly overlapping written track boundaries so that a center-to-center distance between directly adjacent tracks (e.g., the track pitch) is uniform across an area (e.g., a radial zone or across an entire surface of the magnetic storage medium 108). Specifically, View B illustrates a first series of alternating tracks (e.g., the tracks 131 and 133) with a wider written track width than a second series of alternating data tracks (e.g., the tracks 130, 132, and 134). The first series of alternating tracks are bottom tracks, and the second series of alternating tracks are top tracks.

According to one implementation, each wide data track (i.e., bottom track) of the first series is written before the data is written to any directly-adjacent data tracks (i.e., top tracks) of the second series. For example, the data track 131 is written before data is written to either of the data tracks 130 and 132. Data writes to the data tracks 130 and 132 may subsequently overwrite outer edge portions of the data track 131; however, the data track 131 is still readable due to sufficient information retained in a center region of the data track 131.

One consequence of IMR is that a bottom track (e.g., a data track 131) is not randomly writable when data is stored on a directly adjacent top data track (e.g., the data track 130 or 132). As used herein, a data track is "randomly writable" when the data track can be individually re-written multiple times without significantly degrading data on other adjacent data tracks. An adjacent data track is "significantly degraded" if reading the data track results in a number of read errors in excess of a maximum number of errors that can be corrected by a correction code (ECC) of the data storage device 100. Top tracks (e.g., data tracks 130, 132, and 134) are generally randomly writable because they can be individually rewritten without degrading data on other adjacent data tracks. However, some implementations of IMR systems have issues with servo write off track (SWOT), meaning that the write head of the transducer head 120 writes off center of the target track and into an adjacent track resulting in a degradation of the data on the adjacent track. For example, if transducer head 120 is writing on top track 132 it may write off center of the top track 132 (e.g., toward the bottom track 131), which may degrade the data on the bottom track 131. When the transducer head 120 suffers from SWOT such as in the example described above, it may not have an effect on the opposing top track (e.g., the top track 130). Only the adjacent bottom track 131 may be affected.

In some implementations, top tracks (e.g., top track 130) may include one or more super parity sectors to account for storage media failure modes other than a SWOT, such as grown defect. However, because a SWOT when writing a top track generally affects only adjacent bottom tracks and may not affect adjacent top tracks, top tracks may not include super parity sectors to account for a SWOT. Bottom tracks may need to include one or more super parity sectors to account for SWOT. Therefore, the number of super parity sectors on a top track may generally be less than the number of super parity sectors on bottom tracks. Thus, additional space for user data is available on top tracks.

In typical IMR systems, both bottom tracks (e.g., the bottom track 131) and top tracks (e.g., the top track 130) include super parity sectors for error correction. However, because the data of the bottom tracks (e.g., bottom track 131 or 133) may be affected during SWOT of a top track (e.g., the top track 132), it may be necessary to include super parity sectors (e.g., the super parity sector 170 on the bottom track 131 and the super parity sector 172 on the bottom track 133) to enable error correction for each bottom track. Because the top tracks (e.g., top tracks 130,132, and 134) are randomly writeable and any adjacent top track is generally read (e.g., top tracks 130 and 132) before a bottom track (e.g., 131) can be re-written, it may not be necessary to include a super parity sector on any top track. Because super parity sectors may not be included to correct errors on top tracks, the space can be used for additional user data.

A sector based ECC encoder adds coding redundancies to a data stream to enable error correction within an area of a storage medium. When data is read back from the area of the storage medium, ECC coding redundancies stored in the super parity sectors are used to help insure that the data is read back correctly. A sector-based ECC as described herein may be used to correct data from a number of data sectors by analyzing data read from the number of sectors.

The error-correcting capability of an encoder or multiple encoders is, in some implementations, limited by the number of parity sectors holding the redundancies that the encoders add to the data stream. In theory, the larger the number of parity sectors associated with a data track, the larger number of errors that can be corrected in the data when it is read back. However, as more super parity sectors are added to the data stream, more space is delegated to these super parity sectors at the expense of data sectors. Thus tradeoffs between storage space and error correction power exist.

The above-described IMR data management techniques can be used to increase storage media area for user data. Storage area gains for IMR systems are described further with respect to the following figures.

Figure 2:
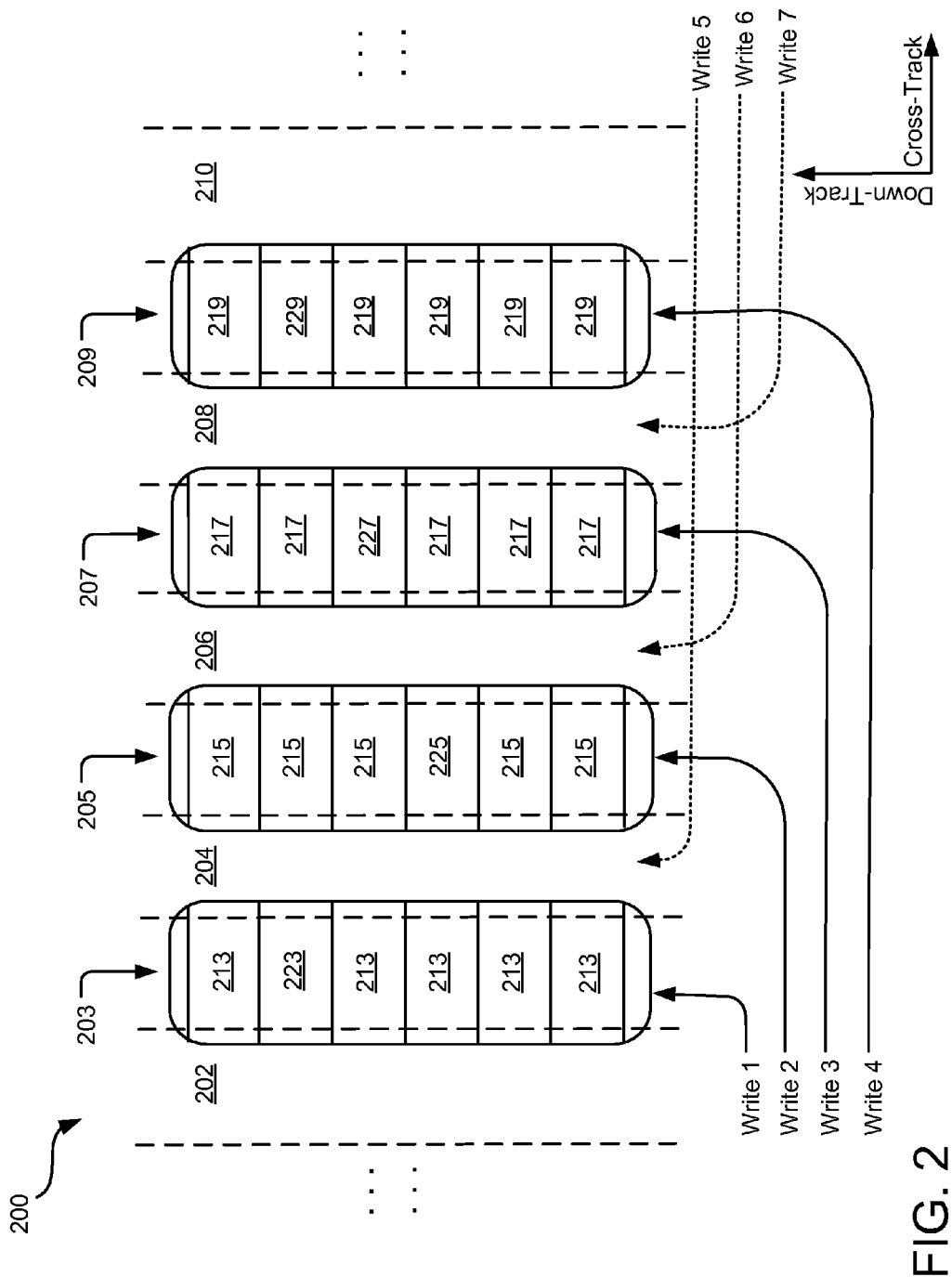
FIG. 2 illustrates example data writes to a magnetic disc in an interlaced magnetic recording (IMR) system.

FIG. 2 illustrates example data writes 200 to a magnetic disc in an interlaced magnetic recording (IMR) system. A controller (not shown) of the IMR system implements a write management scheme to ensure that groupings of adjacent data tracks are written in an order such that data of almost all tracks are readable and a total read/write processing time is mitigated. The prioritized write access scheme may govern data writes to an entire magnetic disc, or (alternatively) govern data writes to a subset of a magnetic disc, such as a radial zone or partitioned storage area of the magnetic disc.

According to one implementation, the write management scheme includes multiple phases, with different write prioritization rules applied during each distinct phase. In a first phase of the write management scheme, data is written exclusively to bottom tracks. In some implementations consecutive bottom tracks (e.g., bottom tracks 203, 205, 207, 209) are written to in a consecutive order as illustrated by the notation "Write 1," "Write 2," "Write, 3" and "Write 4." However, other implementations are contemplated. For example, bottom tracks (e.g., bottom tracks 203, 205, 207, and 209) may be written non-sequentially, such as writing every other bottom track or writing in some other order. During this first phase, the bottom tracks are divided into sectors and some sectors are reserved as data sectors (e.g., data sectors 213, 215, 217, and 219) and other sectors are reserved as super parity sectors (e.g., super parity sector 223, 225, 227, and 229). The data sectors hold user data; in contrast, the super parity sectors are encoded with redundancies by error correction code (ECC). For example, super parity sector 223 will be encoded with redundancies to correct error in reads from bottom track 203, and super parity sector 225 will be encoded with redundancies to correct errors in reads from bottom track 205.

The first phase of writing bottom tracks with data sectors and super parity sectors continue until a first capacity condition is satisfied. For example, the first capacity condition may be satisfied when 50% of the data tracks in a region (i.e., a specific radial or zone or the entire disc surface) store data. During this first phase of the data management method, each of the bottom data tracks (e.g., bottom tracks 203, 205, 207, and 209) can be written to at random and directly overwritten without re-writing data of adjacent data tracks.

After the first capacity condition is satisfied, a second phase of the write management scheme commences and the controller begins to direct new incoming data to the top data tracks (not shown). In some implementations, consecutive top data tracks are written to in a consecutive order as illustrated by the notation "Write 5," "Write 6," and "Write 7." However, other implementations are contemplated. For example, top tracks may be written non-sequentially such as every other top track. By writing to alternating top data tracks (e.g., "Write 5" then "Write 7"), the storage device can avoid reading/re-writing more than two data tracks in a single track write for a period of time as the storage media fills up. In IMR implementations, the top tracks are divided into sectors, and some sectors are reserved as super parity sectors. In this example implementation, the top tracks are divided into sectors, but no sectors are reserved as super parity sectors. Super parity sectors may not be required for the top tracks because they are randomly writeable and generally must be read into memory to rewrite any adjacent bottom sector. This scheme results in more user data sectors and is explained further with respect to FIGS. 3 and 4.

Figure 3:
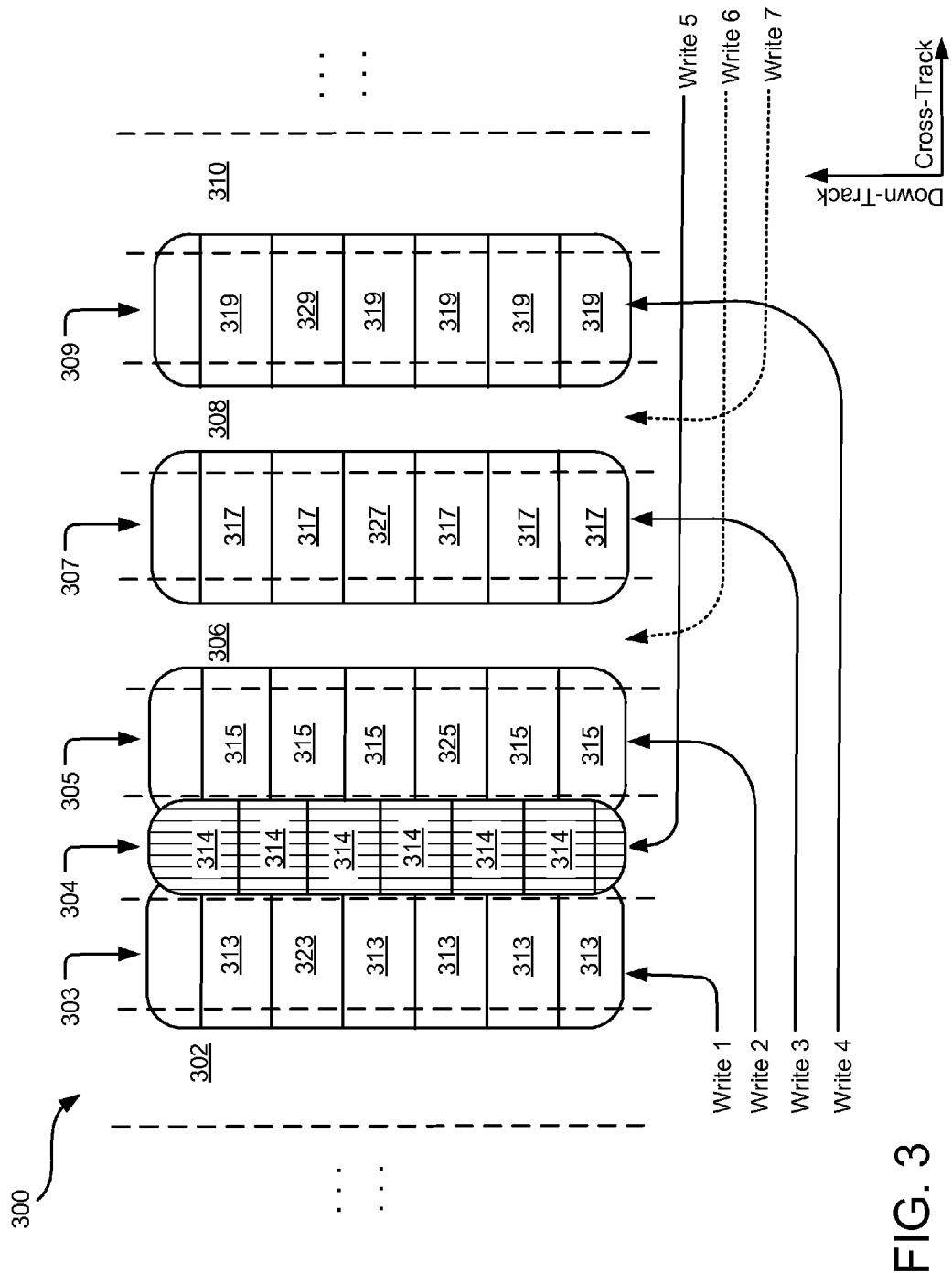
FIG. 3 illustrates another example of data writes to a magnetic disc in an IMR system.

FIG. 3 illustrates another example of data writes 300 to a magnetic disc in an IMR system. A controller (not shown) of the IMR system implements a write management scheme to ensure that groupings of adjacent data tracks are written in an order such that data of almost all tracks are readable and a total read/write processing time is mitigated. The prioritized write access 'scheme may govern data writes to an entire magnetic disc, or (alternatively) govern data writes to a subset of a magnetic disc, such as a radial zone or partitioned storage area of the magnetic disc.

According to one implementation, the write management scheme includes multiple phases, with different write prioritization rules applied during each distinct phase. In a first phase of the write management scheme, data is written exclusively to bottom tracks. In some implementations consecutive bottom tracks (e.g., bottom tracks 303, 305, 307, 309) are written to in a consecutive order as illustrated by the notation "Write 1," "Write 2," "Write, 3" and "Write 4." However, other implementations are contemplated. For example, bottom tracks (e.g., bottom tracks 303, 305, 307, and 309) may be written non-sequentially such as every other bottom track. During this first phase, the bottom tracks are divided into sectors and some sectors are reserved as data sectors (e.g., data sectors 313, 315, 317, and 319) and other sectors are reserved as super parity sectors (e.g., super parity sectors 323, 325, 327, and 329). The data sectors hold user data; in contrast, the super parity sectors are encoded with redundancies by error correction code (ECC). For example, the super parity sector 323 will be encoded with redundancies to correct error in reads from the bottom track 303, and the super parity sector 325 will be encoded with redundancies to correct errors in reads from the bottom track 305.

The first phase of writing bottom tracks with data sectors and super parity sectors continue until a first capacity condition is satisfied. For example, the first capacity condition may be satisfied when 50% of the data tracks in a region (i.e., a specific radial or zone or the entire disc surface) store data. During this first phase of the data management method, each of the bottom data tracks (e.g., bottom tracks 303, 305, 307, and 309) can be written to at random and directly overwritten without re-writing data of adjacent data tracks.

After the first capacity condition is satisfied, a second phase of the write management scheme commences and the controller begins to direct new incoming data to the top data tracks (e.g., the top track 304). In some implementations, consecutive top data tracks are written to in a consecutive order as illustrated by the notation "Write 5," "Write 6," and "Write 7." However, other implementations are contemplated. For example, top tracks may be written non-sequentially such as every other top track. By writing to alternating top data tracks (e.g., "Write 5" then "Write 7"), the storage device can avoid reading/re-writing more than two data tracks in a single track write for a period of time as the storage media fills up.

Top tracks are generally randomly writeable and generally must be read into memory to rewrite any adjacent bottom track. For example, over-writing bottom track 303 during the second phase of the write management scheme entails (1) reading the top track 304 to a temporary cache location; (2) writing the bottom track 303; and (3) re-writing the top track 304 after the write of the bottom track 303 is complete.

Further, during the second phase of the write management scheme, the bottom tracks (e.g., bottom tracks 303 and 305) may be affected by servo write off track (SWOT), which is the result of a transducer head (not shown) being off-center of a target top track (e.g., the top track 304) while writing. A SWOT can degrade the data on an adjacent bottom track (e.g., the bottom track 305). However, a SWOT generally does not affect an adjacent top track (e.g., a data track located in an area 306 between the bottom tracks 305 and 307). Because top tracks are generally randomly writeable and the data of top tracks may not be affected by a SWOT, super parity sectors are not needed to correct the data of top tracks when the top tracks are read. The space reserved for parity sectors can now be used for user data (e.g., data sectors 314), resulting in more user data space across the entire storage medium.

Figure 4:
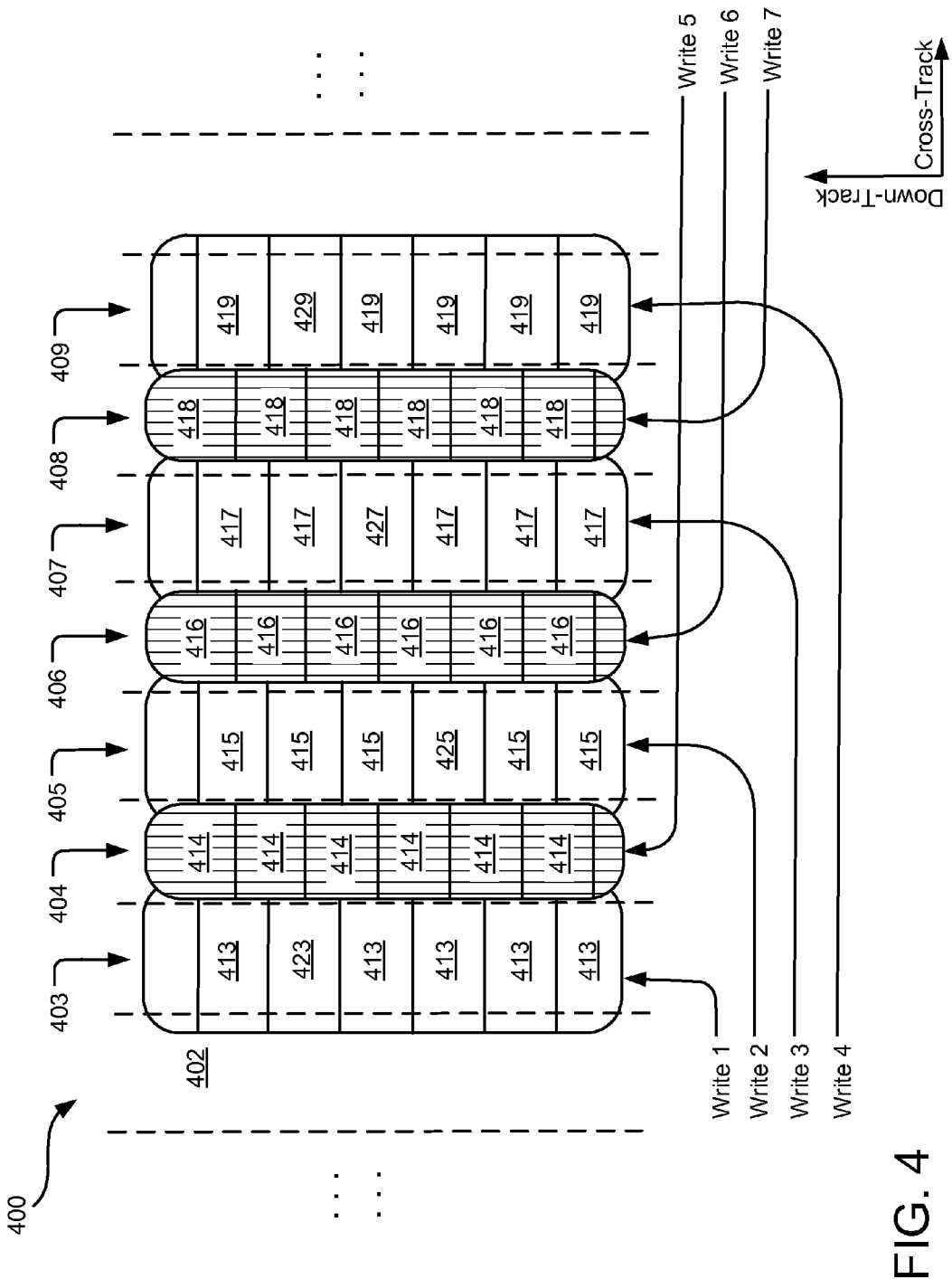
FIG. 4 illustrates yet another example of data writes to a magnetic disc in an IMR system.

FIG. 4 illustrates another example of data writes 400 to a magnetic disc in an IMR system. A controller (not shown) of the IMR system implements a write management scheme to ensure that groupings of adjacent data tracks are written in an order such that data of almost all tracks are readable and a total read/write processing time is mitigated. The prioritized write access scheme may govern data writes to an entire magnetic disc, or (alternatively) govern data writes to a subset of a magnetic disc, such as a radial zone or partitioned storage area of the magnetic disc.

According to one implementation, the write management scheme includes multiple phases, with different write prioritization rules applied during each distinct phase. In a first phase of the write management scheme, data is written exclusively to bottom tracks. In some implementations consecutive bottom tracks (e.g., bottom tracks 403, 405, 407, 409) are written to in a consecutive order as illustrated by the notation "Write 1," "Write 2," "Write,3" and "Write 4." However, other implementations are contemplated. For example, the bottom tracks (e.g., bottom tracks 403, 405, 407, and 409) may be written non-sequentially such as every other bottom track. During this first phase, the bottom tracks are divided into sectors and some sectors are reserved as data sectors (e.g., data sectors 413, 415, 417, and 419) and other sectors are reserved as super parity sectors (e.g., super parity sectors 423, 425, 427, and 429). The data sectors hold user data; in contrast, the super parity sectors are encoded with redundancies by error correction code (ECC). For example, the super parity sector 423 will be encoded with redundancies to correct error in reads from the bottom track 403, and the super parity sector 425 will be encoded with redundancies to correct errors in reads from the bottom track 405.

The first phase of writing bottom tracks with data sectors and super parity sectors continue until a first capacity condition is satisfied. For example, the first capacity condition may be satisfied when 50% of the data tracks in a region (i.e., a specific radial or zone or the entire disc surface) store data. During this first phase of the data management method, each of the bottom data tracks (e.g., bottom tracks 403, 405, 407, and 409) can be written to at random and directly overwritten without re-writing data of adjacent data tracks.

After the first capacity condition is satisfied, a second phase of the write management scheme commences and the controller begins to direct new incoming data to the top data tracks (e.g., top tracks 404, 406, and 408). In some implementations, consecutive top data tracks are written to in a consecutive order as illustrated by the notation "Write 5," "Write 6," and "Write 7." However, other implementations are contemplated. For example, top tracks may be written non-sequentially such as every other top track. By writing to alternating top data tracks (e.g., "Write 5" then "Write 7"), the storage device can avoid reading/re-writing more than two data tracks in a single track write for a period of time as the storage media fills up.

Top tracks are generally randomly writeable and must generally be read into memory to rewrite any adjacent bottom track. For example, over-writing the bottom track 405 during the second phase of the write management scheme entails (1) reading the top tracks 404 and 406 to a temporary cache location; (2) writing the top track 405; and (3) re-writing the top tracks 404 and 406 after the write of the bottom track 405 is complete.

Further, during the second phase of the write management scheme, the bottom tracks (e.g., bottom tracks 403 and 405) may be affected by servo write off track (SWOT), which is the result of a transducer head (not shown) being off-center of a target top track (e.g., top track 404) while writing. A SWOT can degrade the data on an adjacent bottom track (e.g., bottom track 405). However, a SWOT generally does not affect an adjacent top track (e.g., e.g., top track 406). Because top tracks are generally randomly writeable and the data of top tracks may not be affected by a SWOT, super parity sectors are not needed to correct the data of top tracks when the top tracks are read. The space reserved for parity sectors can now be used for user data (e.g., data sectors 414, 416, 418), resulting in more user data space across the entire storage medium.

Figure 5:
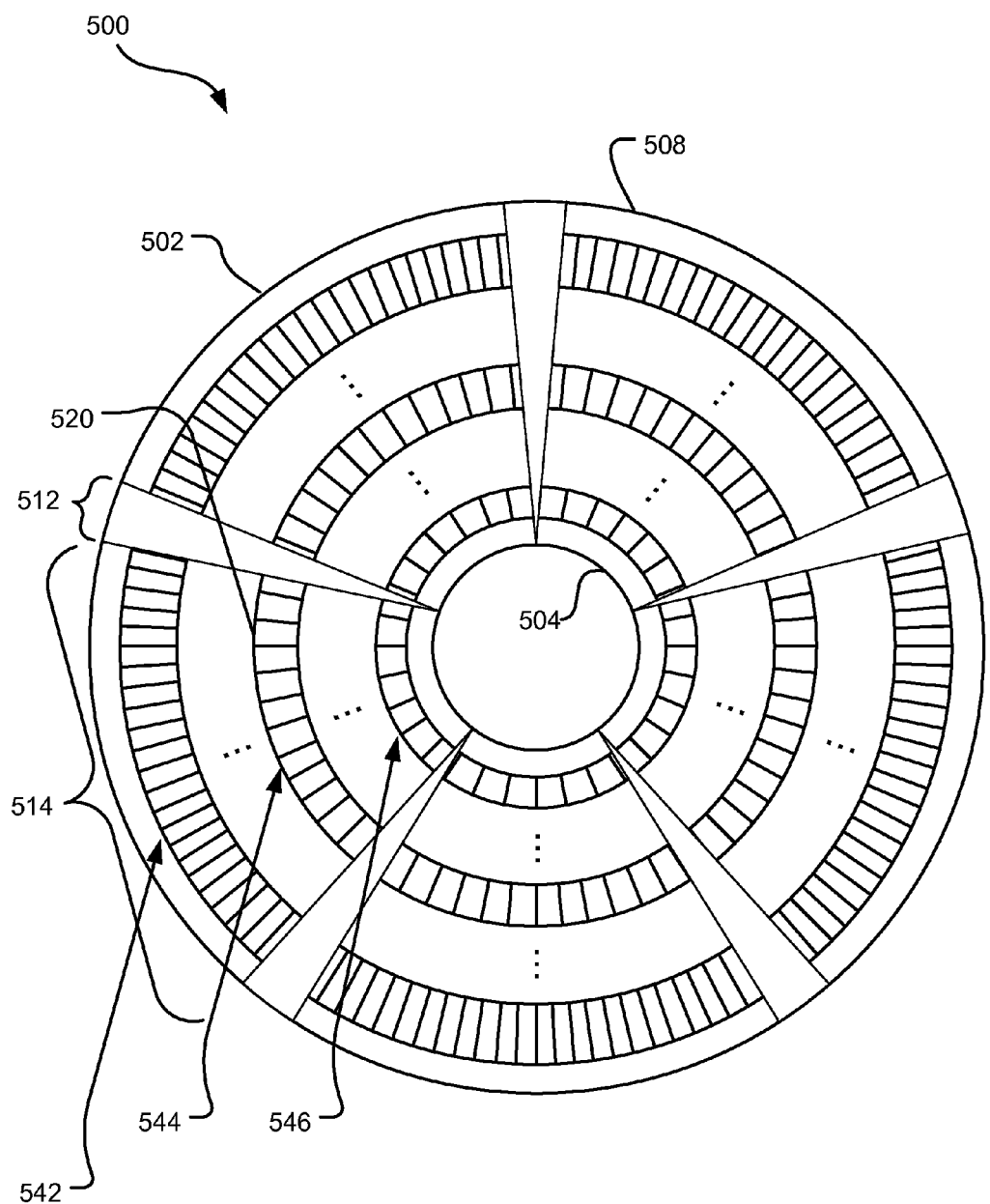
FIG. 5 illustrates an example storage media system.

FIG. 5 illustrates an example data storage system 500. The storage system 500 includes magnetic storage media 508. Although other implementations are contemplated, the magnetic storage media 508 is, in FIG. 1, a magnetic storage disc on which data bits can be recorded using a magnetic write pole and from which data bits can be read using a magnetoresistive element (not shown). The magnetic storage media 508 includes a number of servo sectors (e.g., a servo sector 512) extending radially between an inter diameter 504 and outer diameter 502. In one implementation, each of the servo sectors includes embedded information used for track seeking and track following. In particular, the information includes fine head position information used for centerline tracking Between every two consecutive servo sectors (e.g., servo sector 512) is a wedge (e.g., a wedge 514) that includes a length of multiple data tracks (e.g., data tracks 542, 544, and 546). The data tracks are divided into a number of sectors (e.g., sector 520). Each sector 520 is either a data sector that holds user data or a super parity sector that holds redundancies for error correction.

The data tracks (e.g., 542, 544, and 546) of the magnetic storage media 508 may be grouped into different physical zones between the inner diameter 504 and the outer diameter 502. For example, data track 546 may be assigned to a zone 1; data track 544 may be assigned to a zone 2; and data track 542 may be assigned to a zone 3. In other implementations, the media 508 may be grouped into greater than or fewer than three different zones. Each of the zones of the magnetic storage media 508 may include more than 1 data track.

In this example implementation, the data tracks 542, 544, and 546 include one or more super parity sectors. This example implementation may be used in systems other than IMR systems, such as PMR (perpendicular magnetic recording), SMR (shingled magnetic recording), BPM (bit patterned media), etc. In this example implementation, the number of parity sectors on a track is selected based on the track's distance from inner diameter 504 of magnetic storage media 508. Tracks that are closer to inner diameter 504 (e.g., data track 546) have less usable area than a track that is further from inner diameter 504 (e.g., data track 542). Consequently, a track nearer to inner diameter 504 will hold less data than a track nearer to outer diameter 502. As a result of the lower amount of data, a track near the inner diameter 504 will require less space for holding redundancies for error corrections in one or more super parity sectors than a track near an outer diameter, which will require more redundancies for the larger amount of data. For example, the data track 546 may include three super parity sectors data track 544 may include four super parity sectors; and data track 542 may include five super parity sectors. In one implementation, the number of parity sectors per track may increase proportionally with the increase in distance of each track from the inner diameter 504. However, in alternative implementation, the increase in the number of super parity sectors may be not proportional with the increase in the distance of each track from the inner diameter 504.

Figure 6:
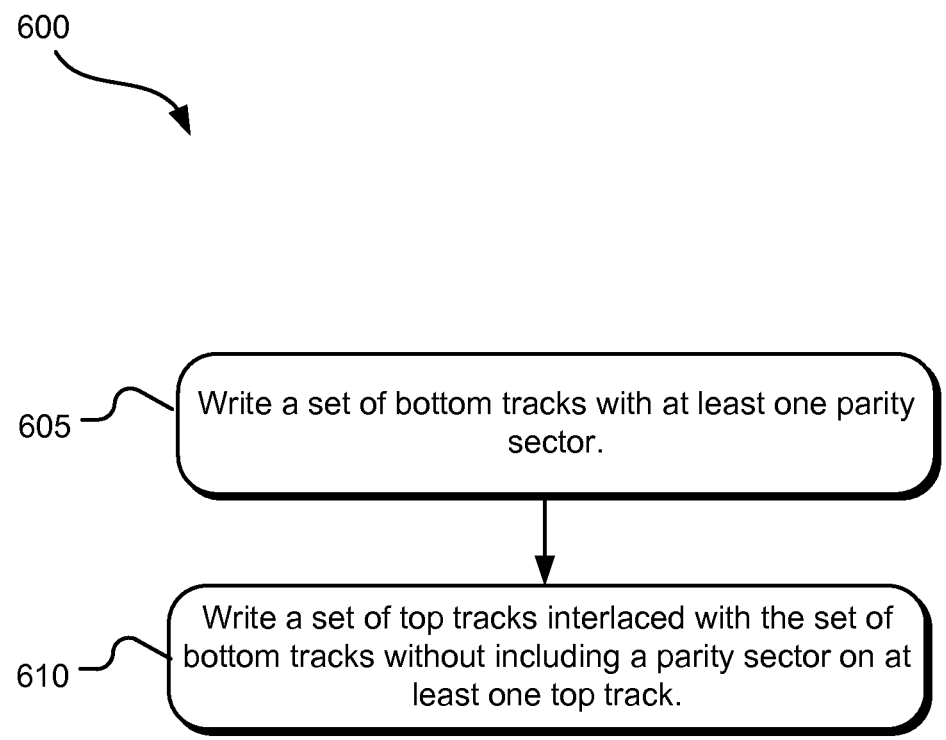
FIG. 6 illustrates example operations for writing to a magnetic disc in an IMR system.

FIG. 6 illustrates example operations 600 for writing to a magnetic disc in an IMR system. The operations 600 may be controlled by a storage controller, which includes a processor. The storage controller may control the location of read and writes, and controls the inclusion of one or more parity sectors on data tracks. The storage controller may also control the writing of servo sectors. A writing operation 605 writes set of bottom tracks with at least one parity sector.

The writing operation 605 may be in response to a write command from the storage controller. The write command may include an amount of data and a location on the magnetic disc. One or more data sectors are filled with the amount of data and the at least one super parity sector is encoded according to an error correction code (ECC). The write operation 605 may select and write a number of super parity sectors depending on a distance between a data track of the set of bottom tracks and an inner diameter of the magnetic disc. The write operation 605 may write the data tracks in an order according to a prioritization rule controlled by the storage controller. A second write operation 610 writes a set of top tracks interlaced with the set of bottom tracks. The second write operation 610 may be in response to a write command from the storage controller. The write command may include an amount of data and a location on the magnetic disc. The second write operation 610 writes does not write a data sector on at least one data track of the set of top tracks. The second write operation 610 will write the set of top tracks in an order according to a prioritization rule, controlled by the storage controller.

Figure 7:
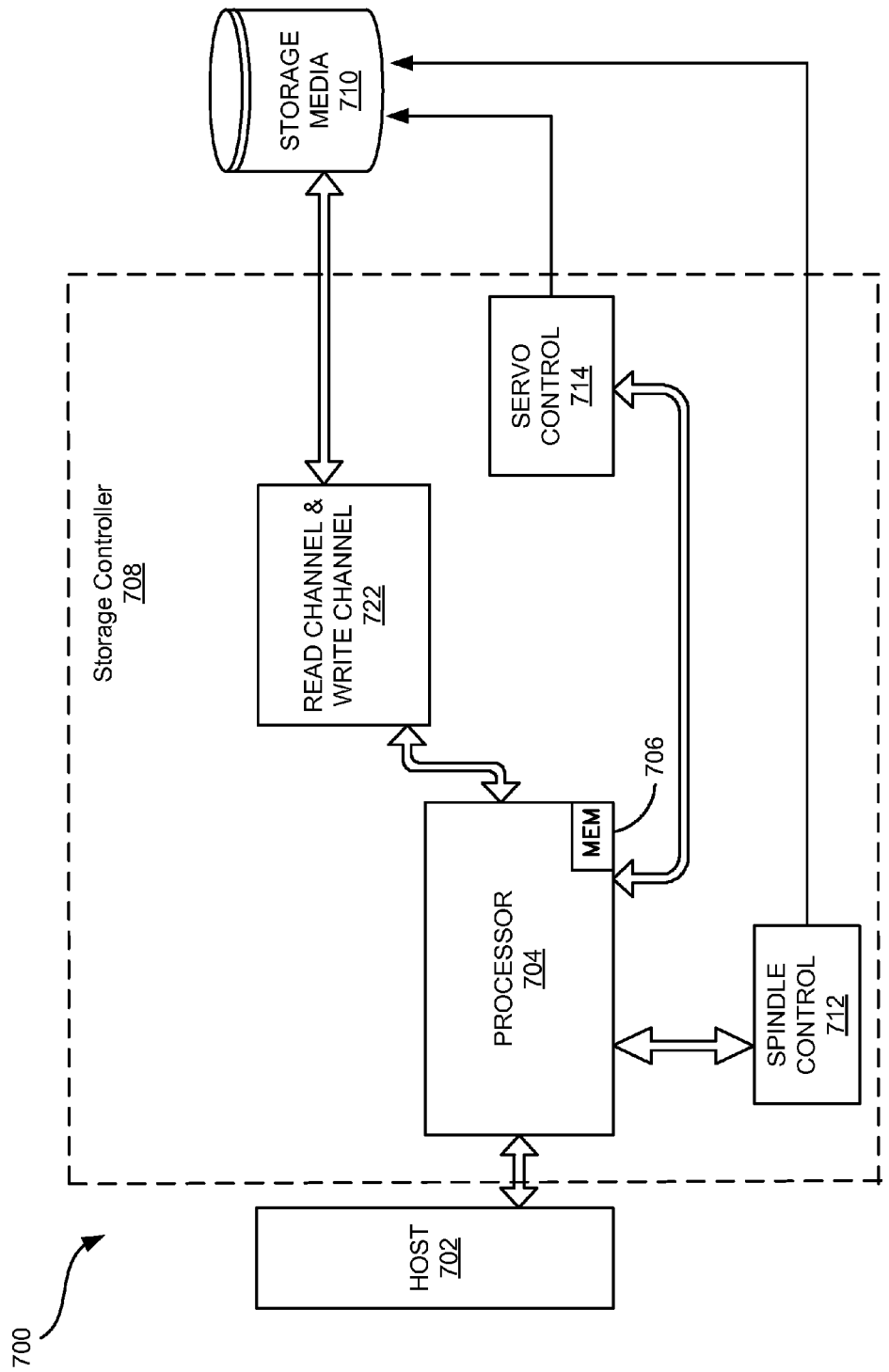
FIG. 7 illustrates an example schematic of storage controller of a disc drive assembly.

FIG. 7 illustrates an example schematic 700 of a storage controller 708 of a disc drive assembly. Specifically, FIG. 7 shows one or more functional circuits that are resident on a printed circuit board used to control the operation of the disc drive. The controller 708 is operably and communicatively connected to a host computer 702. Control communication paths are provided between the host computer 702 and a processor 704, the processor 704 generally providing top-level communication and control for the controller 708 in conjunction with processor readable instructions for the processor 704 encoded in processor readable storage media 706. The processor readable instructions comprise instructions for controlling writing to and reading from data tracks on a storage media 710. The processor readable instructions further include instructions for encoding parity bits on parity sectors on the data tracks of storage media, the parity sectors providing error correction for the storage data tracks on storage media 710.

The term "processor readable storage media" includes but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a processor. In contrast to tangible processor-readable storage media, intangible processor-readable communication signals may embody processor readable instructions, data structures, program modules or other data resident in a modulated data signal, such as a carrier wave or other signal transport mechanism. Note that while, the system for management of system files on a storage device is disclosed herein in context of an HDD, one or more aspects the technology disclosed herein may also be applicable to other storage devices enumerated above.

The storage controller 708 controls storage of data on the storage media 710 such as magnetic disc, optical discs, etc. A spindle motor control circuit 712 controls the rotation of storage media 710. A servo circuit 714 provides control for moving an actuator that moves heads (not shown) between tracks on the storage media 710 and controls the position of the head.

Other configurations of storage controller 708 are contemplated. For example, storage controller 708 may include on or more of an interface circuitry, a buffer, a disc drive platform buffer manager (PBM), a formatter, etc. The processor readable instructions may be included on the host computer or somewhere else on a storage system.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage device comprising:
a storage media including a plurality of data tracks, the plurality of data tracks including a subset of bottom tracks and a subset of top tracks, wherein at least one bottom track of the subset of bottom tracks includes one or more super parity sectors providing error correction for the at least one bottom track of the subset of bottom tracks, and wherein at least one top track of the subset of top tracks does not include one or more super parity sectors.

2. The storage device of claim 1, wherein the subset of top tracks is interlaced with the subset of bottom tracks.

3. The storage device of claim 1, wherein the subset of bottom tracks is written before the subset of top tracks.

4. The storage device of claim 1, further comprising a storage controller configured to control reading from and writing to the subset of top tracks and the subset bottom tracks in a manner that avoids data corruption.

5. The storage device of claim 1, wherein a number of super parity sectors of the one or more super parity sectors is selected based on a distance of the at least one bottom track of the subset of bottom tracks from an inner diameter of the storage media.

6. The storage device of claim 1, wherein a write of a first data track of the subset of top tracks does not affect data of an adjacent second data track of the subset of top tracks.

7. A method comprising:
writing a set of bottom tracks to a storage medium, wherein the set of bottom tracks includes at least one parity sector; and
writing a set of top tracks to the storage medium, wherein each top track of the set of top tracks is interlaced with two bottom tracks of the set of bottom tracks, and wherein at least one top track of the set of top tracks does not include a super parity sector.

8. The method of claim 7, wherein the set of bottom tracks and the set of top tracks include servo sectors.

9. The method of claim 8, wherein writing a top track of the set of top tracks does not affect data of an adjacent track of the set of top tracks.

10. The method of claim 8, wherein the set of bottom tracks are written before the set of top tracks.

11. The method of claim 8, further comprising:
reading at least one top track of the set of top tracks into a temporary cache;
over-writing an adjacent bottom track of the set of bottom tracks; and
re-writing the at least one top track after the over-writing of the adjacent bottom track is complete.

12. The method of claim 7, wherein a number of parity sectors on the set of bottom tracks is selected based on a distance between a bottom track of the set of bottom tracks and a diameter of the storage medium.

13. The method of claim 7, wherein the parity sectors provide error correction for the set of bottom tracks.

14. One or more processor-readable storage media encoding computer-executable instructions for executing on a computer system a computer process, the computer process comprising:
writing a set of bottom tracks to a storage medium, wherein the set of bottom tracks includes at least one parity sector; and
writing a set of top tracks to the storage medium, wherein each top track of the set of top tracks is interlaced with two bottom tracks of the set of bottom tracks, and wherein at least one top track of the set of top tracks does not include a super parity sector.

15. The one or more processor-readable storage medium of claim 14, wherein the set of bottom tracks and the set of top tracks include servo sectors.

16. The one or more processor-readable storage medium of claim 15, wherein writing a top track of the set of top tracks does not affect data of an adjacent track of the set of top tracks.

17. The one or more processor-readable storage medium of claim 15, wherein the set of bottom tracks are written before the set of top tracks.

18. The one or more processor-readable storage medium of claim 15, further comprising:
reading at least one top track of the set of top tracks into a temporary cache;
over-writing an adjacent bottom track of the set of bottom tracks; and
re-writing the at least one top track after the over-writing of the adjacent bottom track is complete.

19. The one or more processor-readable storage medium of claim 14, wherein a number of parity sectors on the set of bottom tracks is selected based on a distance between a bottom track of the set of bottom tracks and a diameter of the storage medium.

20. The one or more processor-readable storage medium of claim 14, wherein the parity sectors provide error correction for the set of bottom tracks.

* * * * *